United States Patent [19]

Cappi

[11] Patent Number: 4,624,190
[45] Date of Patent: Nov. 25, 1986

[54] APPARATUS FOR THE DISPOSAL OF FLUE GAS FROM GAS OR LIQUID-FUEL BOILER-BURNER GROUPS

[76] Inventor: Silvano Cappi, Via Pescetti 15, Verona, Italy

[21] Appl. No.: 699,370

[22] Filed: Feb. 7, 1985

[30] Foreign Application Priority Data

Feb. 15, 1984 [IT] Italy .............................. 84910 A/84

[51] Int. Cl.⁴ ............................................. F23J 15/00
[52] U.S. Cl. ..................... 110/215; 55/227; 55/228; 261/DIG. 9
[58] Field of Search ............ 110/215; 165/161; 261/DIG. 9; 55/227, 228

[56] References Cited

U.S. PATENT DOCUMENTS

| | | | |
|---|---|---|---|
| 3,797,204 | 3/1974 | Cavatassi | 261/DIG. 9 |
| 3,904,376 | 9/1975 | Kawata | 261/DIG. 9 |
| 3,958,630 | 5/1976 | Smith | 165/161 |
| 3,996,862 | 12/1976 | Besik et al. | 110/215 X |
| 4,344,920 | 8/1982 | Isserlis | 110/215 X |
| 4,416,855 | 11/1983 | Abrams et al. | 110/215 X |
| 4,489,679 | 12/1984 | Holt | 110/215 X |
| 4,491,093 | 1/1985 | Hoekstra | 110/215 X |
| 4,520,761 | 6/1985 | Arnold | 110/215 X |

Primary Examiner—Edward G. Favors
Attorney, Agent, or Firm—Guido Modiano; Albert Josif

[57] ABSTRACT

An apparatus for the disposal of flue gas from gas or liquid-fuel boiler-burner groups. The apparatus comprises at least one processing tower in which hot flue gas from a boiler-burner group is scrubbed with water, a tank for collecting the scrubbing water and scrubbed gases from the processing tower, and a filtering system for the scrubbing water.

2 Claims, 15 Drawing Figures

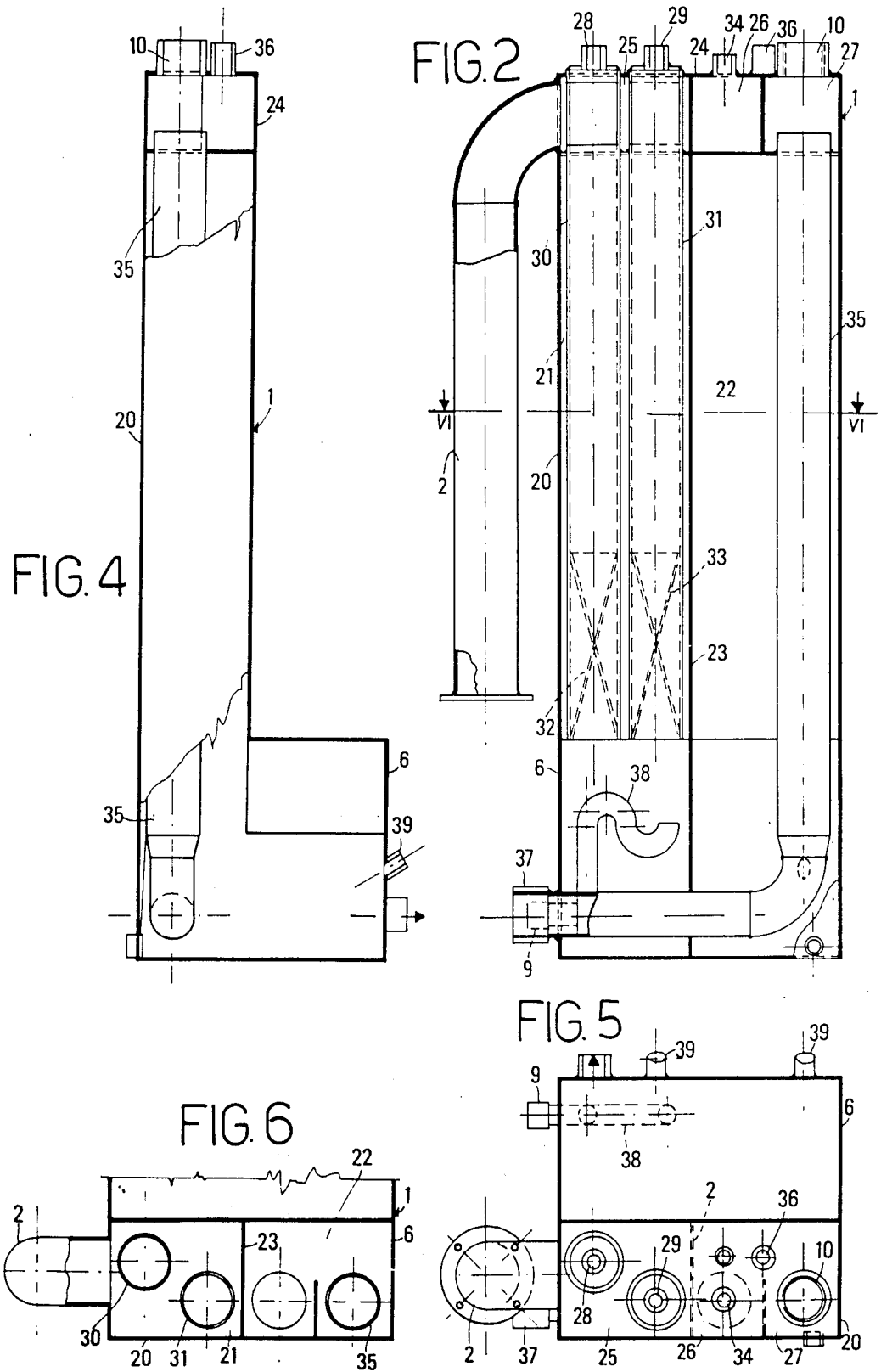

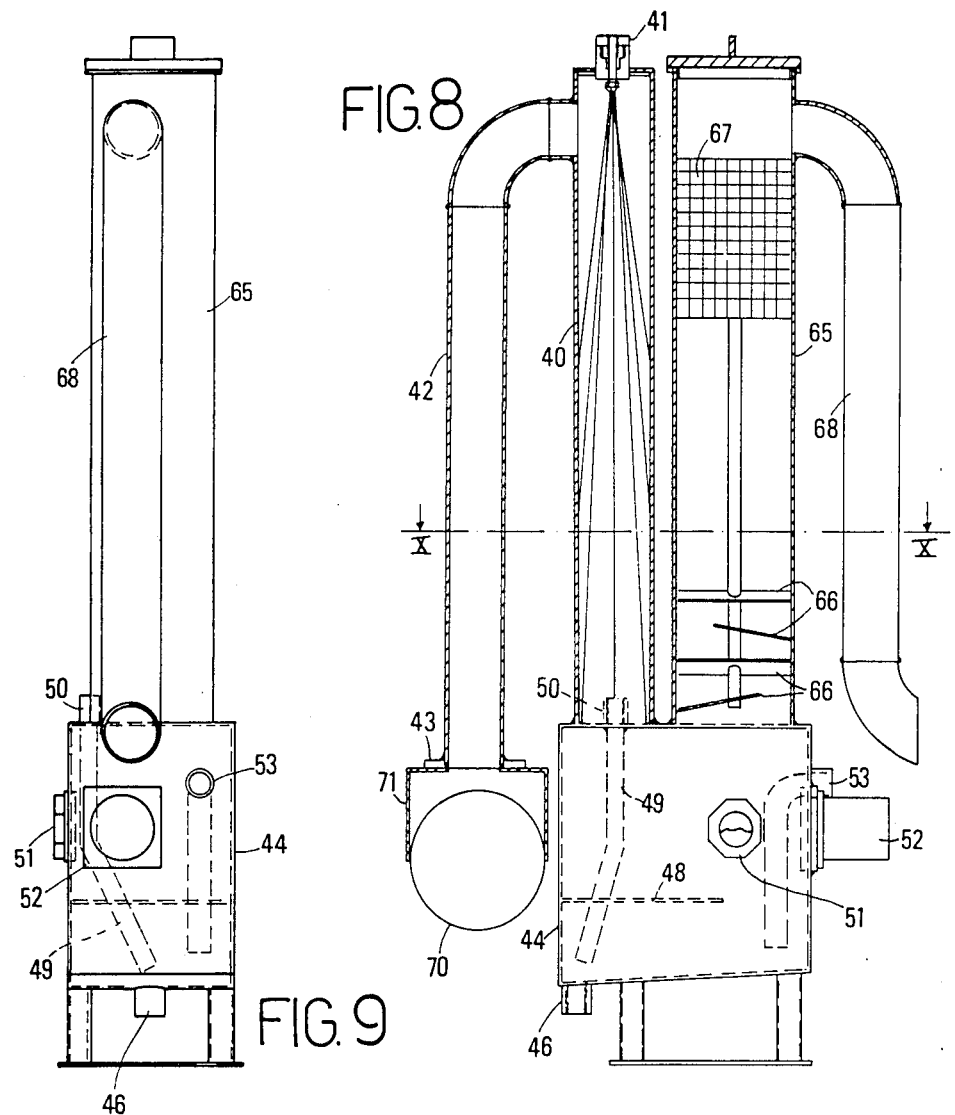
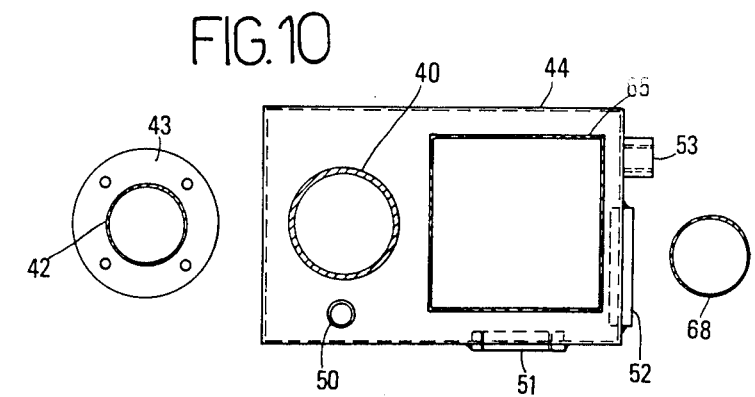

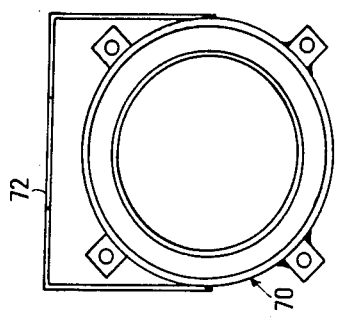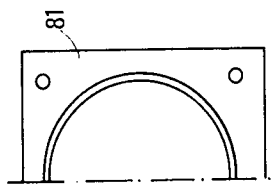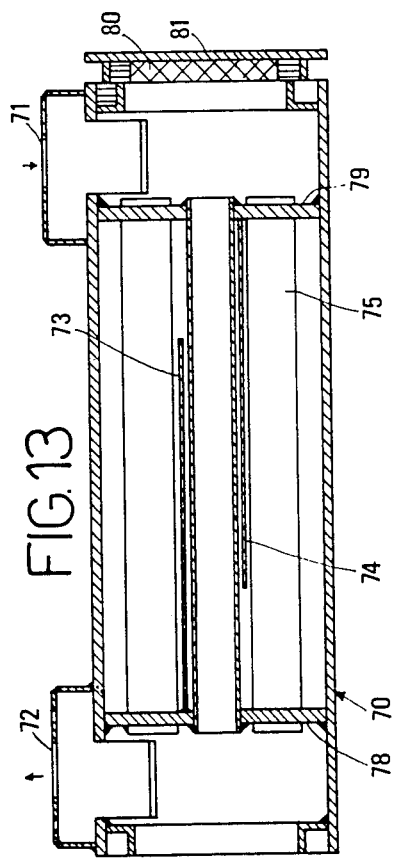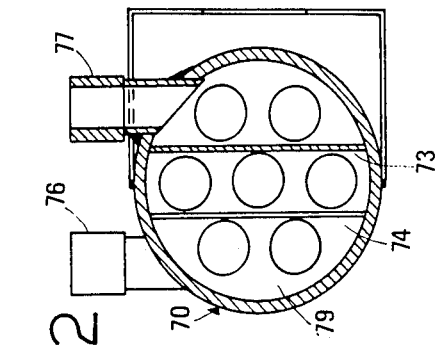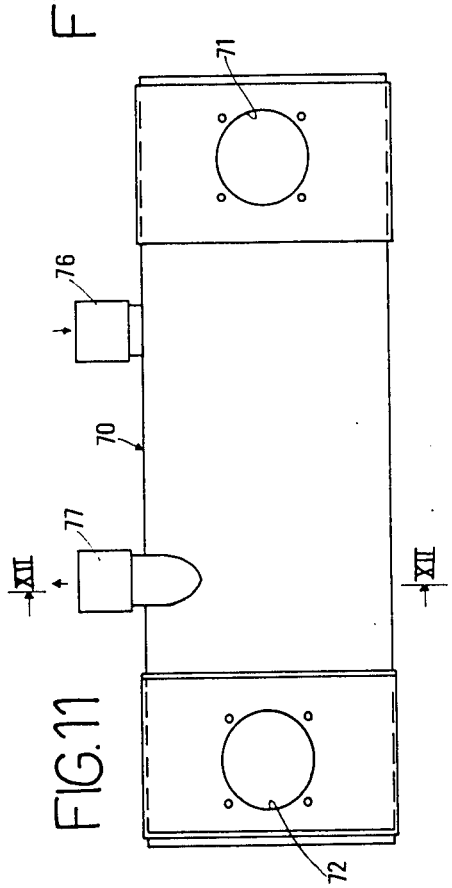

APPARATUS FOR THE DISPOSAL OF FLUE GAS FROM GAS OR LIQUID-FUEL BOILER-BURNER GROUPS

BACKGROUND OF THE INVENTION

This invention relates to an apparatus for the disposal of flue gas from gas or liquid-fuel boiler-burner groups.

As is known, a heat generator (e.g. a boiler equipped with either a gas or oil burner) for the production of steam, hot water, or heated air, is provided with a flue. The building in of a flue is almost invariably an expensive operation whose costs may exceed that of the generator. Not unfrequently, the installation of a flue in an existing building is subjected to authorization, such as by public administration, a number of co-owners, etc. The smoke issuing from a flue is generally polluting and may be objected to by neighbors. In addition, using a flue brings about further costs for maintenance, cleaning, etc.

Electric generators of steam and hot air are non-polluting but quite often uneconimical on account of the high costs of electric power. Furthermore, for domestic use the supply upper limit is fixed as a rule at 20 to 25 kW (equivalent to 25-31 kg steam/hour) which, although adequate for most domestic purposes, falls short of the requirements of such minor crafts as laboratories, laundry establishments, etc. Moreover, it should be borne in minde that for higher installed powers, it is often mandatory that the user makes arrangements at its own expense for the inclusion of a specifically provided and expensive transformer room.

The availability of a smoke trap which can eliminate the need for a flue for heat generators which are far more economical than electric generators, would be highly desirable.

SUMMARY OF THE INVENTION

It is an object of the present invention to provide an apparatus for the disposal of flue gas from gas or liquid-fuel heat generators for the production of steam, hot water, and/or hot air, which ensures complete disposal of the heat generator combustion gases, thereby making the use of a flue proper unnecessary, while fully preventing both the environment air and close spaces, such as workrooms, etc., where the heat generators are utilized, from being polluted.

Another object of the present invention is for the said flue gas disposal apparatus to make it possible a significant increase in the efficiency of heat generators by taking advantage in a rational way of all the heat in the flue gas.

It is a further object of the present invention to provide a flue gas disposal apparatus designed to be advantageously used both with existing heat generators and heat generators of new design.

Another object of the present invention is to provide a flue gas disposal apparatus which is highly reliable, of low manufacturing cost and requires little maintenance.

These and other objects which will be apparent hereinafter, are achieved by a flue gas disposal apparatus for gas or liquid-fuel boiler-burner groups, which comprises at least one tower unit in which flue gas from a boiler-burner group is scrubbed with water, a collector unit for receiving the scrubbing water and scrubbed flue gas from said tower unit, and a filtering system arranged to filter the scrubbing water.

BRIEF DESCRIPTION OF THE DRAWINGS

Further features and advantages of this invention will be more clearly understood from the following detailed description of some at present referred but not exclusive embodiments thereof, given herein by way of non-limiting examples with reference to the accompanying drawings, in which:

FIG. 2 is a front elevational section view showing on a larger scale the flue gas disposal apparatus of FIG. 1;

FIG. 4 is a side view, from the right side, of the flue gas disposal apparatus of FIG. 2;

FIG. 5 is a top view of FIG. 2;

FIG. 6 is a cross-sectional view taken along the line VI—VI of FIG. 2;

FIG. 8 is a detailed front elevational view on an enlarged scale of the flue gas disposal apparatus of FIG. 7;

FIG. 9 is a side view, from the right side of the apparatus of FIG. 8;

FIG. 10 is a cross-sectional view taken along the line X—X of FIG. 8;

FIG. 11 is a front elevation view of a heat exchanger;

FIG. 12 is a cross-sectional view taken along the line XIII—XIII of FIG. 11;

FIG. 13 is a longitudinal and axial sectional of the heat exchanger of FIG. 11 rotated through 90°;

FIG. 14 is a fragmentary side view from the right side of the heat exchanger of FIG. 13; and FIG. 15 is a side view from the left side of the heat exchanger of FIG. 13.

DESCRIPTION OF THE PREFERRED EMBODIMENTS

Figure 3:
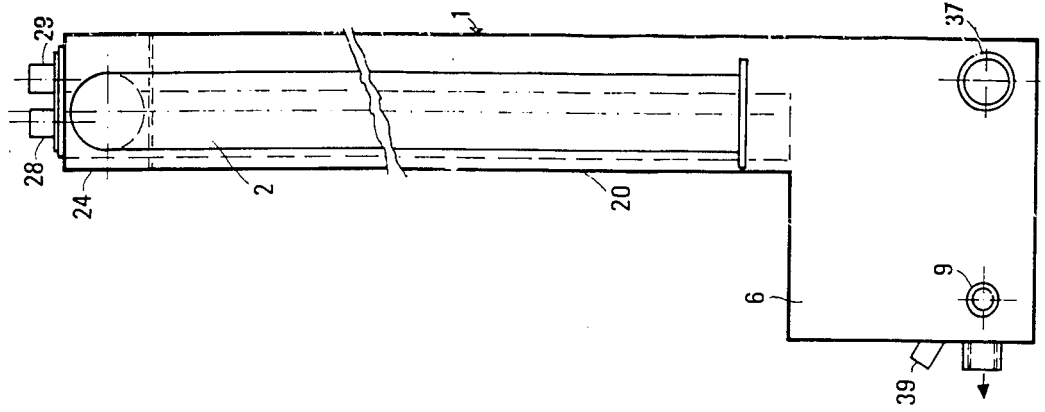
FIG. 3 is a side view, from the left side, of the flue gas disposal apparatus of FIG. 2.
Figure 1:
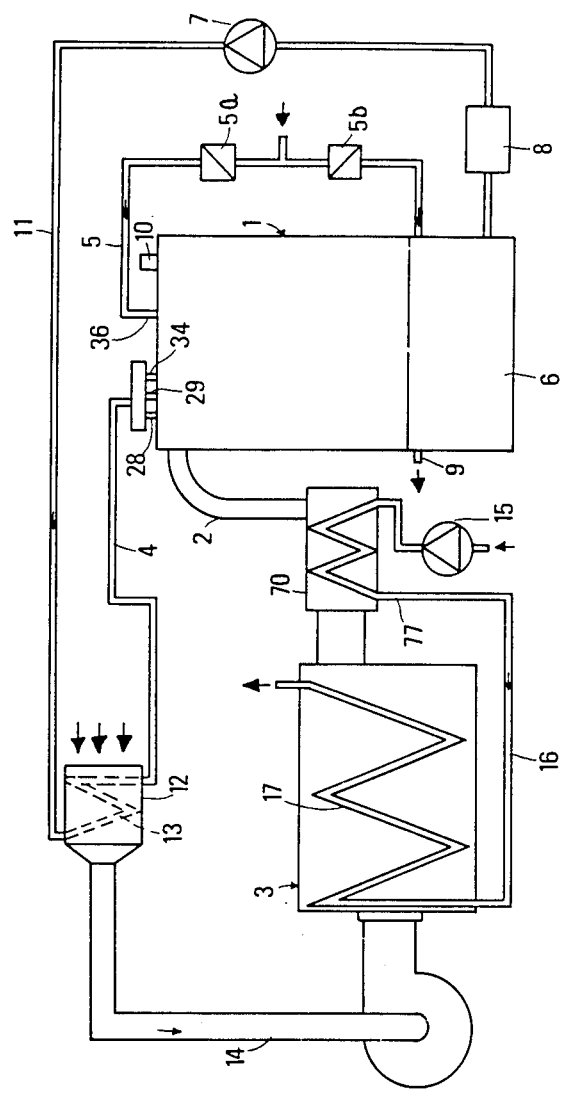
FIG. 1 is a general diagram showing a flue gas disposal apparatus as applied to an oil-fired boiler-burner group.

With reference at first to FIGS. 1 to 6, an embodiment of an open circuit flue gas disposal apparatus 1 is arranged to receive, through a duct 2, the flue gas from a boiler-burner group or heat generator 3 of an oil-fired kind, the flue gas being previously cooled down to about 70°–80° C. in a heat exchanger 70. The disposal apparatus 1 is also fed at its top, through a conduit 4, with recycle water and via a conduit 5 controlled by a solenoid valve 5a with fresh water. The fed water falls through the disposal apparatus, scrubs the flue gas and is collected in a receiving tank 6 at the bottom of the disposal apparatus from where it is forced by a pump 7 to pass through a filter 8, such as a re-usable cartridge filter, which is designed to hold solenoid particles, e.g. unburned particles now suspended in the water and brought in with the flue gas.

Excess water in the receiving tank 6 is discharged in the drainage system through a drain pipe 9, whilst the oxygen-lean air deprived of combustion gases and cooled by water contact is released through an exhuast duct 10 at the top, or is eliminated together with new fresh water through an outlet conduit 37, as further explained hereinafter.

The delivery of the pump 7 communicates with a conduit 11 opening into a heat exchanger 12. The heat exchanger 12 can comprise a suction fan 12a to suck ambient air which is caused to sweep across a coil 13, through which water from the conduit 11 flows, and thus transfers a high proportion of its heat to the air being sucked by the fan. The sucked air is thus preheated before being fed to the burner in the group 3 via a line 14. The scrubbing water which is cooled while flowing through the heat exchanger 12, is fed to the conduit 4 to be recycled to the top of the disposal apparatus 1.

As mentioned above, the flue or combustion gases leaving the heat generator 3 are conveyed to the heat exchanger 70, through which water is caused to flow by a pump 15. The combustion gases give off heat to the water which is thus preheated before being fed, through a conduit 16, to a coil 17 within the boiler-burner group 3 where it is heated to a desired higher temperature or converted into steam.

The apparatus 1 is shown in more detail in FIGS. 2 to 6. It comprises a standing casing 20 which is divided into two compartments 21 and 22 by a vertical partition 23 which also extends into the underlying tank 6. Provided at the top of the casing 20 is a manifold 24 which is also divided into a number of separate compartments 25, 26 and 27. Into one side of the compartment 25 opens the duct 2 to feed in it the combustion gases issuing from the heat exchanger 70. Two water-ejecting nozzles 28 and 29 are mounted on top of the compartment 25. The stream issuing from each ejector 28 or 29 is directed into a respective vertical pipe 30, 31 and reaches the tank 6. Advantageously, a respective breakwater 32 or 33 is provided in each pipe 30, 31. With this arrangement gases supplied to the compartment 25 of the manifold 24 are carried away and scrubbed by the steams or jets issuing from the ejectors 28 and 29 are forced to flow along the ducts 30 and 31 and enter the tank 6 where they lap on the water contained therein and are then released to flow upwards in the compartment 22. Inside the compartment 22, the scrubbed gases move counter-currently, i.e. against a downward jet or stream of atomized water generated by an atomizer 34 located at the top of the manifold compartment 26 which is in direct communication with the underlying compartment 22.

While being conveyed downwards along the compartment 21, the flue gas undergoes a cooling, scrubbing, and purifying process whereby it becomes free from solid particles suspended therein, whereas along its upward flow path within the compartment 22, it undergoes additional scrubbing and is cooled down to ambient temperature. At the top of the compartment 22, the purified flue gas may be either released directly through the exhaust duct 10 which could be connected to a pipe (not shown) opening into the outside atmosphere or, where the exhaust duct 10 is blocked, it can enter and flow down a column 35 in which it could undergo further scrubbing by a nozzle 36 and be discharged through the outlet conduct 37 to a drainage system.

The atomizing nozzle 36 is supplied with cold water by a water sypply system 5 (FIG. 1) for example, at a flow rate ranging from 10 to 30 liters/hour, also depending on the climate conditions of the apparatus installation site. The scrubbing treatment carried out by the two ejectors 28 and 29 and the purifying action in counter-current effected by the atomizer 34 occur by using water circulated by the pump 7 in a closed pipe circuit (FIG. 1) and continuously cooled by the radiator or heat exchanger 12, as mentioned above.

All the water used in the processing towers is collected in the tank 6 and is circulated together with the unburned solid particles suspended in it by the centrifugal pump 7 through the filter 8, e.g. a 25–30 microns mechanical filter which can be regenerated, the heat exchanger or radiator 12 and the two ejector nozzles 28 and 29 and the atomizer nozzle 34.

The receiving tank 6 has several compartments, so as to ensure separation to a certain extent between the area underneath the two ejector nozzles 28 and 29 and that underneath the nozzles 34 and 36, thereby providing intercommunicating zones in which, however, direct mixing of the water issuing from the ejectors with the water from the atomizers is prevented.

A specific siphon-type overflow arrangement is arranged to remove any water in excess coming either from the atomizing nozzle 36 or from a water system sypply controlled by a solenoid valve 5b thereby ensuring a minimum water level in the tank. This arrangement is also designed to ensure a constant temperature be maintained in the processing water flowing through the closed circuit including the pump 7.

Advantageously, a further safety device may be provided which is driven by probes housed in respective sets 39 formed on the tank. Such a device is arranged to effect, e.g. through a digital display (not shown), emergency water replacement in the tank 6 should a limit be reached beyond which the boiler-burner group 3 must be stopped, or to detect, through the display, a failure in the system which may be responsible, for example, for faulty combustion in the burner or faulty conditions for heat exchange in various components of the system, etc.

The scrubbed combustion gases may be discharged from the apparatus in two distinct ways, i.e. by a combined discharge, through the outlet 37 in communication with the column or tower 35, of precessed flue gas (mainly comprising nitrogen and carbon monoxide) mixed with ambient air, e.g. at a rate of 10–30 liters/hour, or through separate outlets, i.e. release of processed flue gas from the upper portion of the apparatus 1 through the exhaust duct 10 and discharge of water from the lower portion of the apparatus through the drain pipe 9.

Actual tests have shown that with a system such as that described above and illustrated in FIGS. 1 to 6, at the end of the flue gas processing there is obtained clean water free from any unburned material and practically oxygen-free air including nitrogen, rare gas traces and a carbon monoxide content below 100 ppm, namely far lower than the limits, e.g. 200 ppm, provided by regulations in force in some countries.

Figure 7:
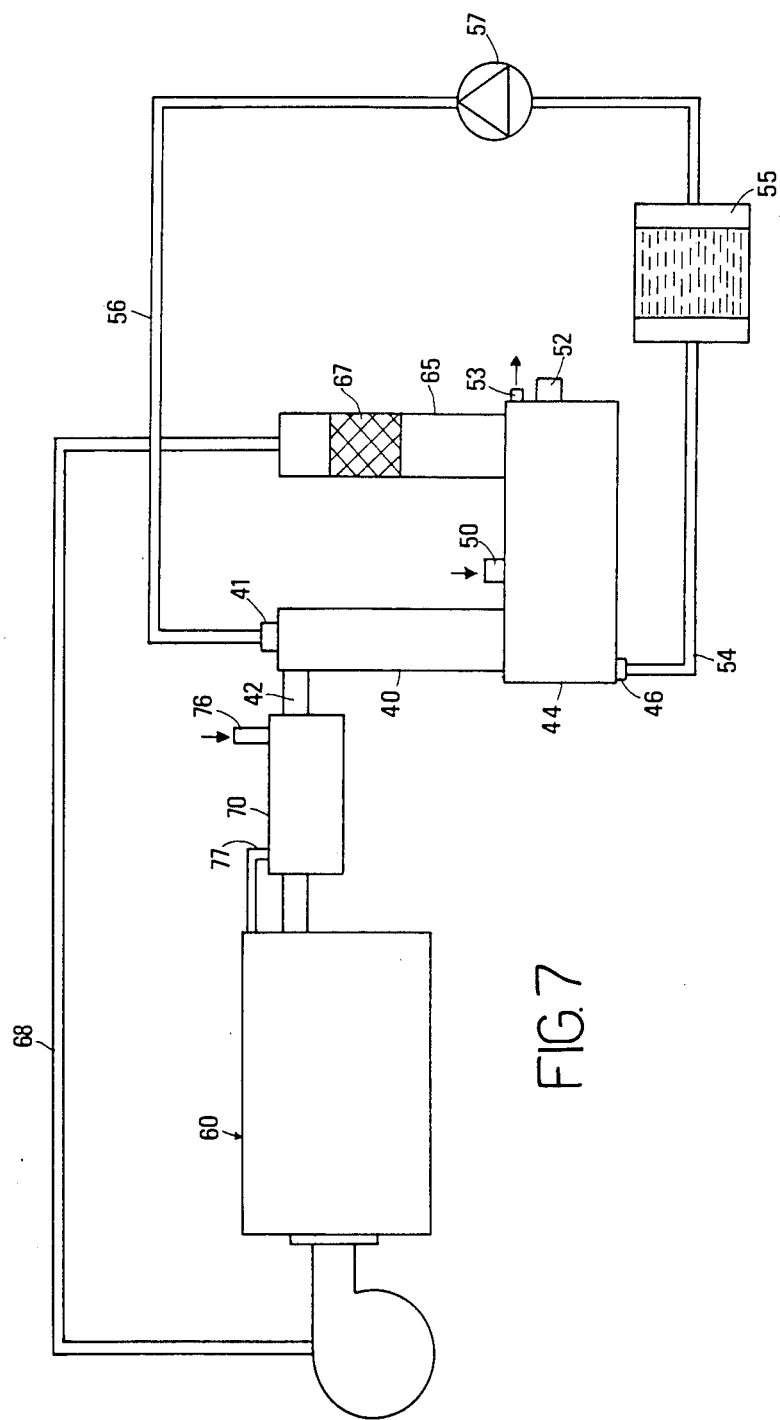
FIG. 7 shows a block diagram of another embodiment of a flue gas disposal apparatus according to the invention, as applied to an oil-fired heat generator.

FIGS. 7 to 10 show a closed-circuit flue gas disposal apparatus which includes five main components: a scrubbing tower 40, a settling tank 44, a dehumidifier 65, and two recycling systems, one for the treatment water and the other for the scrubbed flue gas. The scrubbing tower 40 is supported on, and in direct communication with, the settling tank 44. At the top of the tower 40 there is a sprinkling-atomizing device 41 which is arranged to inject water from above downwards into the tower. The device 41 is calibrated to ensure delivery of a preset amount of water per unit time in a jet having preselected pressure and expansion angle, thereby sweeping the entire inner light of the tower to create a vacuum therein. Into the top of the tower 40 and below the device 41, there opens a combustion gas intake duct 42 which is flanged at 43 at its free end for connection to the gas outlet end of the heat exchanger 70 in which the combustion gases released by a boiler-burner group 60 give off heat, e.g. to generate steam for industrial purposes. The combustion gases from the duct 42 are conveyed, also owing to the vacuum formed by the sprinkling device 41, into the tower 40 where they are subjected to cooling (e.g. a decrease in temperature from 130°–150° C. to 60°–80° C.), solubilization of the soluble components contained in them, and separation of the solid-particles suspended in them, as explained with reference to the embodiment shown in FIGS. 1 to 6.

The gases scrubbed in the tower 40 and the scrubbing water (i.e. water containing soluble components of the flue gas, such as carbon monoxide and solid residues) are discharged into the underlying receiving tank 44. The letter has a bottom 45 sloping towards a discharge opening 46 above which a baffle plate 48 is mounted cantilever-fashion. Through the baffle plate 48, the dipping end of a water supply pipe 49 extends to just above the discharge opening 46. The pipe 49 has, at its other end extending outside the tank 44, a pipe union 50 for connection to a water system. The tank 44 is also equipped with a level indicator 51, a magnetic sensor 52 arranged to act in response to changes in the liquid level in the tank, and a dipped overflow tube 53 which may be connected to a drain.

The discharge opening 46 is connected (FIG. 7) through a pipe 54 to a filtering unit 55, e.g. of a replaceable cartridge type, which is designed to free the water from solid residues and substances dissolved therein before being recycled, through a conduit 56 by a centrifugal pump 57, to the sprinkling device 41 located on top of the tower 40.

Advantageously the scrubbing tower 40 can enclose the evaporator of a refrigerating circuit 40a to cause proper cooling of the combustion gases and water passing through the tower.

The gases scrubbed in the scrubbing tower 40 are collected at the top of the tank 44, above the surface of the water contained therein, and then enter the dehumidifying unit 65 which from the top of the tank 44 extends upwards to the same height as the tower 40. The unit 65 at its end close to the tank 44 can be provided with condensate deflectors 66 and with a dehumidifying filter 67, such as a filter comprising a replaceable honeycomb cartridge. The filter 67 serves to trap moisture and possible molecular groups including carbon monoxide not retained in the tank 44. At the outlet of the filter 67 there is obtained a stream of dry purified oxygen-lean air at a temperature of about 50°–80° C. which is supplied, after being enriched with oxygen, by being in communication with an oxygen source (not shown), to the burner of the group 60 via an exhaust duct 68.

The operation of the disposal apparatus described above is simple. Once the heat generator 60 is started, flue gas is exhausted into the heat exchanger 70 which has a large heat transferring surface which is heated by the flue gas and is arranged to preheat water to be fed to the boiler. The cooled combustion gases leaving the heat exchanger 70 enter the scrubbing lower 40 where they are swept by the water jet from the device 41 and further cooled by the evaporator if provided within the tower 40. From the tower 40, the oxygen-lean air free from residues and combustion gases laps on the surface of the water in the tank 44, passes through the dehumidifying tower 65 and, after being reoxygenated is fed to the burner in the group 60.

The scrubbing water from the tower 40 is collected the tank 44, and this causes the level in the tank to raise until the electromagnetic threshold sensor 52 operates the motor-driven pump 57. The pump 57 sucks water from the tank 44 through the filter 55 and supplies it clean to the top of the tower 40. Should the sensor 52 or pump 57 become inoperative for any reason, the overflow tube 53 will discharge the excess water outside, e.g. to a drainage system. It should be noted that water from the tank 44 is non-polluting, first of all because the combustion residues (carbon monoxide and unburned carbonaceous micro-residues) contained therein are generally biodegradable, and secondly because the amounts involved are small in any case, being of the order of 2 liters/hour per kg of steam produced by the generator 60.

Of course, also this embodiment is provided with suitable safety means against possible shortage or cutting off in the water supply either to the disposal apparatus or to the boiler-burner group 60, too high temperature in the tower 40, failures in the refrigerating circuit heat exchangers, etc. To increase safety against environment pollution by carbon monoxide, the heat generator 60 may be so arranged as to stop as soon as a failure occurs in the disposal apparatus.

It has been found that the application of a disposal apparatus according to the invention to a boiler-burner group results in an efficiency increase of the latter ranging from a minimum of 5% up to 35% and higher.

A heat exchanger 70 suitable for taking advantage of the heat given off by the combustion gases from the group 3 or 60 is shown in FIGS. 11 to 15. It comprises an inlet 71 and outlet 72 and delimits inside thereof a labyrinth path for the flue or combination gases owing to the presence of two offset deflectors 73 and 74. Located in the flue gas path are several lengths of a water pipe coil 77. Such a pipe coil has a cold water inlet end 76 connected to a water supply system and an outlet end 77 for heated water connected to the boiler in the group 3 or 60. The various lengths of the coil 75 are supported on two cross segments 78 and 79. The ends of the heat exchanger 70 may be insulated by means of refractory material 80 held in position by end plates 81.

In the field of the small users of heat generators where electric generators are more frequently employed to produce medium pressure steam, a gas or oil-fired heat generator equipped with a flue gas disposal apparatus according to this invention can successfully replace electric generators with substantial power savings that may be as high as 80%.

In new installations of heat generators, equipped with a flue gas disposal apparatus of this invention, the expense for the construction and maintenance of a flue is fully eliminated.

The invention as disclosed above is susceptible to many modifications and changes without departing from the scope thereof as deducible from the appended claims.

I claim:

1. An apparatus for the disposal of flue gas from a gas or liquid-fuel boiler-burner group, the said apparatus comprising
   at least one processing unit which has a first compartment arranged to receive at the upper end thereof flue gas from the boiler-burner group and is provided at the top thereof with a nozzle or nozzles designed to eject water in the said first compartment to scrub, cool and carry away the said flue gas therein, a second compartment arranged to receive at the lower end thereof scrubbed gases released from the said first compartment to further treat them while flowing upwardly along it and includes a nozzle or nozzles at the upper end thereof arranged to eject water there-in to further scrub, cool and purify the said scrubbed flue gas countercurrently flowing upwardly along it, an exhaust duct or opening for the treated flue gas, a fresh water supply system, a scrubbing column, and a water ejecting nozzle or nozzles disposed at the top of the column and in fluid communication with the fresh water supply system to further scrub and cool the said purified gases issuing from the said second compartment, a collecting unit disposed underneath the said processing unit to receive scrubbing water and scrubbed flue gases directly from it and to direct the said scrubbed flue gases into the said second compartment, and a recycling and filtering system arranged to filter the scrubbing water released from the said collecting unit and to recycle it to the said nozzle or nozzles in the said processing unit.

2. An apparatus for the disposal of flue gas from a gas or liquid-fuel boiler-burner group, the said apparatus comprising at least one processing unit which has a first compartment arranged to receive at the upper end thereof flue gas from the boiler-burner group and an evaporator of a refrigerating circut for cooling the flue gas and scrubbing water and is provided at the top thereof with a nozzle or nozzles designed to eject water in the said first compartment to scrub, cool and carry away the said flue gas therein, a second compartment arranged to receive at the lower end thereof scrubbed gases released from the said first compartment to further treat them while flowing upwardly along it and provid ed and exhaust duct or opening for the treated flue gas, a collecting unit disposed underneath the said processing unit to receive scrubbing water and scrubbed flue gases into the said second compartment, and a recycling and filtering system arranged to filter the scrubbing water released from the said collecting unit and to recycle it to the said nozzle or nozzles in the said processing unit.

* * * * *